(12) United States Patent
Kim et al.

(10) Patent No.: US 12,500,295 B2
(45) Date of Patent: Dec. 16, 2025

(54) EXTERIOR MATERIAL, METHOD OF FORMING PATTERN ON EXTERIOR MATERIAL, AND METHOD OF MANUFACTURING BATTERY INCLUDING EXTERIOR MATERIAL

(71) Applicant: LiBEST INC., Daejeon (KR)

(72) Inventors: Joo Seong Kim, Daejeon (KR); Seung Gyu Lim, Gwangju (KR); Gil Ju Lee, Daejeon (KR)

(73) Assignee: LIBEST INC., Daejeon (KR)

( * ) Notice: Subject to any disclaimer, the term of this patent is extended or adjusted under 35 U.S.C. 154(b) by 560 days.

(21) Appl. No.: 17/996,087

(22) PCT Filed: Jul. 30, 2021

(86) PCT No.: PCT/KR2021/009965
§ 371 (c)(1),
(2) Date: Oct. 13, 2022

(87) PCT Pub. No.: WO2022/025700
PCT Pub. Date: Feb. 3, 2022

(65) Prior Publication Data
US 2023/0187742 A1     Jun. 15, 2023

(30) Foreign Application Priority Data

Jul. 30, 2020  (KR) .................. 10-2020-0095367
Dec. 28, 2020  (KR) .................. 10-2020-0184634

(51) Int. Cl.
*H01M 50/00*     (2021.01)
*H01M 50/124*    (2021.01)
*H01M 50/136*    (2021.01)

(52) U.S. Cl.
CPC ....... *H01M 50/124* (2021.01); *H01M 50/136* (2021.01)

(58) Field of Classification Search
CPC .......................... H01M 50/124; H01M 50/136
See application file for complete search history.

(56) References Cited

U.S. PATENT DOCUMENTS

| 2016/0013459 A1 | 1/2016 | Suh et al. |
| 2016/0093839 A1 | 3/2016 | Iseri et al. |

(Continued)

FOREIGN PATENT DOCUMENTS

| CA | 2884655 C | * 2/2019 | ............ B29C 65/56 |
| CN | 105470414 A | 4/2016 | |

(Continued)

OTHER PUBLICATIONS

Binger et al., Multi-Layered Bags With Discrete Non-Continuous Lamination, May 2013, See the Abstract. (Year: 2013).*

(Continued)

*Primary Examiner* — Tiffany Legette
*Assistant Examiner* — Monique M Wills
(74) *Attorney, Agent, or Firm* — HSML P.C.

(57) ABSTRACT

An exterior material to be used for a battery comprises at least one pattern part formed in a transverse direction (TD) of the exterior material, wherein the TD of the exterior material is a width direction of a battery including the exterior material, and a machine direction (MD) of the exterior material is a longitudinal direction of the battery including the exterior material.

7 Claims, 7 Drawing Sheets

(56) References Cited

U.S. PATENT DOCUMENTS

2017/0117511 A1    4/2017   Takahashi et al.
2017/0263972 A1    9/2017   Rho et al.

FOREIGN PATENT DOCUMENTS

| | | | |
|---|---|---|---|
| CN | 108352464 A | | 7/2018 |
| CN | 111386625 A | | 7/2020 |
| JP | 2003036821 A | * | 2/2003 |
| JP | 2013196947 A | | 9/2013 |
| JP | 2013218991 | | 10/2013 |
| JP | 2017117776 A | | 6/2017 |
| JP | 2019021429 A | * | 2/2019 |
| JP | 2020055286 A | * | 4/2020 |
| KR | 1020050052069 | | 6/2005 |
| KR | 1020150050212 A | | 5/2015 |
| KR | 1020160090106 A | | 7/2016 |
| KR | 1020190024451 A | | 3/2019 |
| WO | 2019045447 A1 | | 3/2019 |

OTHER PUBLICATIONS

Akutsu et al., Laminate for Bag, Comprises Sequential Lamination of Stretched Plastic Films Containing Polyester, and Sealant Film Having Specified Value of Product of Tensile Elongation and Thickness, Apr. 2020, See the Abstract. (Year: 2020).*
Takahagi , Battery-Packaging Material and Battery, Feb. 2019, See the Abstract. (Year: 2019).*
Mochizuki et al., Packaging Material for Batteries, has Sealant Layer of Multilayer Structure Containing High-density Polyethylene Layer, Feb. 2003, See the Abstract. (Year: 2003).*
International Search Report of PCT/KR2021/ 009965, dated Nov. 16, 2021.
Office Action issued in a counterpart Chinese application No. 202180030461.1, mailing date is Jul. 5, 2024, with English translation.
Zhang et al., "Innovation Information in Foreign Energy Field", Sep. 2016, 1st edition p. 12, with translation.
Office Action issued in a counterpart Chinese application No. 202180030461.1, of which mailing date is Feb. 28, 2024, with machine translation.
Search Report issued in a counterpart European application No. 21850173.2 , of which mailing date is Apr. 26, 2024.

* cited by examiner

EXTERIOR MATERIAL, METHOD OF FORMING PATTERN ON EXTERIOR MATERIAL, AND METHOD OF MANUFACTURING BATTERY INCLUDING EXTERIOR MATERIAL

TECHNICAL FIELD

The present disclosure relates to an exterior material, method of forming pattern on exterior material, and method of manufacturing battery including exterior material.

BACKGROUND

An electrochemical cell refers to an assembly that is composed of at least two electrodes and an electrolyte to provide electrical energy, and in particular, lithium-ion batteries configured as chargeable and dischargeable secondary cells are being widely used for various advanced electronic devices including smart phones.

Recently, various attempts have been made to deviate from conventional shapes in the design of mobile devices, including smartphones, and various wearable devices. Also, attention is increasing on flexible devices which can be bent while maintaining their functions. Accordingly, it is important to secure the function and safety of a flexible electrochemical cell which can be built in such a flexible device and can be used as a power source.

If a flexible battery is repeatedly bent and straightened, an exterior material may be damaged. If the exterior material is severely damaged, the internal electrolyte may leak. Also, even if the exterior material is slightly damaged, moisture in the air may permeate into the battery, which may cause swelling of the battery and damage to the electrode and thus may result in a decrease in capacity and output of the battery.

Therefore, in order to suppress damage to the exterior material of the flexible battery by absorbing the compressive stress and tensile stress generated in a portion where the battery is bent, pattern processing is performed by pressing upper and lower molds on the exterior material. Since the pattern-processed exterior material has a high initial modulus of elasticity (initial elastic modulus), the force acting on the exterior material when the battery is bent is dispersed rather than concentrated on one side. Accordingly, the exterior material and an electrode assembly accommodated therein are not severely bent at any one part.

The pattern of the exterior material does not need to be formed deeply, but needs to minimize damage to the exterior material caused by repetitive bending, flexure, folding, twist, etc. of the battery and improve the durability of the battery.

When an external force is applied to the battery, for example, when bending, folding, or twist of the battery occurs, the compressive force applied in a thickness direction rather than the tensile force applied in a longitudinal direction of the exterior material has a greater effect on the durability of the battery.

Also, as the electrode assembly accommodated within the exterior material is deformed, the force pushing the exterior material outwards is applied. If the exterior material does not withstand the force acting from the inner electrode assembly, the inner electrode assembly is easily bent around a weak part of the exterior material and the weak part of the exterior material is damaged, which results in formation of pinholes, cracks or the like.

In order to further improve the durability of the flexible battery, a pattern processing method capable of increasing the bending moment in a portion where the battery is bent needs to be adopted. Specifically, in order to increase the bending durability of the flexible battery, there is a need for a method of forming a pattern to increase the compressive stress of the exterior material.

(Patent Document 1) Korean Patent Laid-open Publication No. 2005-0052069 (published on Jun. 2, 2005)

(Patent Document 2) Japanese Patent Laid-open Publication No. 2013-218991 (published on Oct. 24, 2013)

DISCLOSURE OF THE INVENTION

Problems to be Solved by the Invention

The present disclosure is to solve the problems of the prior art described above, and provides an exterior material to be used for a battery. The exterior material includes at least one pattern part formed in a transverse direction (TD) of the exterior material, the TD of the exterior material refers to a width direction of a battery including the exterior material, and a machine direction (MD) of the exterior material refers to a longitudinal direction of the battery including the exterior material.

An object of the present disclosure is to provide a method of forming a pattern on an exterior material in a direction in which the compressive stress of the exterior material is high to suppress damage to the exterior material and improve the durability of a battery, and a method of manufacturing a battery including the exterior material.

However, the problems to be solved by the present disclosure are not limited to the above-described problems. There may be other problems to be solved by the present disclosure.

Means for Solving the Problems

As a means for solving the problems, according to an aspect of the present disclosure, an exterior material to be used for a battery comprises at least one pattern part formed in a transverse direction (TD) of the exterior material, wherein the TD of the exterior material is a width direction of a battery including the exterior material, and a machine direction (MD) of the exterior material is a longitudinal direction of the battery including the exterior material.

In one embodiment, tensile strength of the exterior material is different between the TD of the exterior material and the MD of the exterior material, and the tensile strength measured in the TD of the exterior material is greater than the tensile strength measured in the MD of the exterior material.

In one embodiment, the exterior material is folded in the MD of the exterior material and used in manufacturing the battery, and the exterior material used in manufacturing the battery is bent in the MD of the exterior material, which enables the battery to be bent in the MD of the exterior material.

In one embodiment, the exterior material is folded in the TD of the exterior material and used in manufacturing the battery, and the exterior material used in manufacturing the battery is bent in the MD of the exterior material, which enables the battery to be bent in the MD of the exterior material.

In one embodiment, the exterior material is applied with a greater compressive stress than another exterior material with at least one pattern part formed in the MD of the exterior material.

In one embodiment, the pattern part is formed in the TD of the exterior material in consideration of probability of damage to an electrode assembly inserted into the exterior material.

In one embodiment, the compressive stress of the exterior material is measured in a state where a load is applied to the exterior material with a displacement limited to a predetermined strain with respect to a height of the pattern part.

In one embodiment, the exterior material is formed into a multilayer structure in which at least one material is laminated.

According to another aspect of the present disclosure, a method of forming a pattern on an exterior material comprises locating the exterior material between an upper mold and a lower mold. and forming at least one pattern part in a transverse direction (TD) of the exterior material by stamping the exterior material using the upper mold and the lower mold, wherein the TD of the exterior material is a width direction of a battery including the exterior material, and a machine direction (MD) of the exterior material is a longitudinal direction of the battery including the exterior material.

According to yet another aspect of the present disclosure, A method comprises forming at least one pattern part on an exterior material in a transverse direction (TD) of the exterior material in a battery including exterior material, folding the exterior material, inserting an electrode assembly into the folded exterior material, and sealing the exterior material into which the electrode assembly is inserted, wherein the TD of the exterior material is a width direction of the battery including the exterior material, and a machine direction (MD) of the exterior material is a longitudinal direction of the battery including the exterior material.

Effects of the Invention

According to any one of the means for solving the problems of the present disclosure described above, the present disclosure provides an exterior material to be used for a battery. The exterior material includes at least one pattern part formed in a transverse direction (TD) of the exterior material, the TD of the exterior material refers to a width direction of a battery including the exterior material, and a machine direction (MD) of the exterior material refers to a longitudinal direction of the battery including the exterior material.

Also, the present disclosure provides a method of forming a pattern on an exterior material in a direction in which the compressive stress of the exterior material is increased, and a method of manufacturing a battery including the exterior material. Accordingly, the resistance to deformation of the battery is increased, which suppresses break of an electrode assembly and minimizes damage to an inner electrode and a separator. Thus, it is possible to improve the durability of the battery.

Further, it is possible to improve the safety and durability of the battery by suppressing damage to the exterior material and leakage of an electrolyte.

Furthermore, it is possible to flexibly change the size of the battery and also possible to manufacture large and long batteries by using a slim device.

BEST MODE FOR CARRYING OUT THE INVENTION

Figure 1:
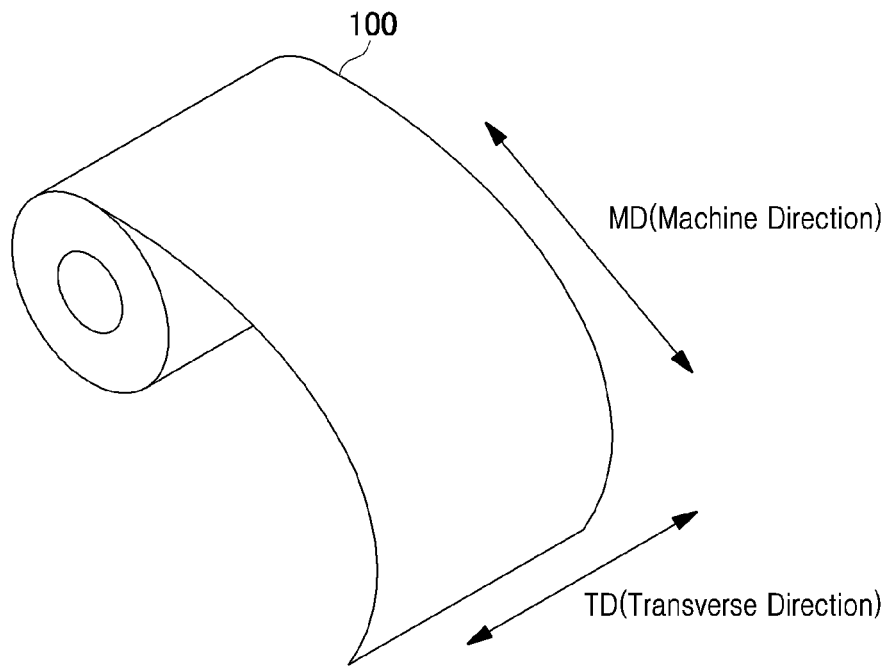
FIG. 1 illustrates an exterior material.

Hereafter, embodiments of the present disclosure will be described in detail with reference to the accompanying drawings so that the present disclosure may be readily implemented by a person with ordinary skill in the art. However, it is to be noted that the present disclosure is not limited to the embodiments but may be embodied in various other ways. In drawings, parts irrelevant to the description are omitted for the simplicity of explanation, and like reference numerals denote like parts through the whole document.

Throughout this document, the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added. Further, throughout this document, the term "connected to" may be used to designate a connection or coupling of one element to another element and includes both an element being "directly connected" another element and an element being "electronically connected" to another element via another element. Furthermore, throughout this document, when a member is said to be located "on" another member, this includes not only when the member is in contact with another member, but also when other member is present between the two members.

A battery including an exterior material according to the present disclosure may be, for example, an electrochemical cell such as a lithium-ion battery. Specifically, the battery including an exterior material according to the present disclosure may be configured such that an electrode assembly is accommodated and sealed with an electrolyte within the exterior material, and charged and discharged by movement of lithium ions. The battery including an exterior material according to the present disclosure may be a flexible battery configured to be bent with flexibility while maintaining its function. Hereinafter, embodiments of the present disclosure will be described in detail with reference to the accompanying drawings.

FIG. 1 illustrates an exterior material. The exterior material 100 may be formed into, for example, a multilayer structure in which at least one material is laminated. At least one material may have ductility.

For example, the multilayer structure of the exterior material 100 may include a sealing layer, a material barrier layer and a protection layer, which are classified depending on the function of each layer. The sealing layer may be formed of a polypropylene (PP) film. The material barrier layer may be formed of aluminum foil. The protection layer may be formed of a nylon film or a nylon and polyethylene terephthalate (PET) composite layer.

The exterior material 100 is manufactured by a roll-to-roll process, and mechanical properties of the exterior material 100 may be different between an axial direction and a longitudinal direction of the roll. Herein, a transverse direction (TD) may refer to the axial direction of the roll, and a machine direction (MD) may refer to the longitudinal direction of the roll.

Due to an exterior material used for a flexible battery, mechanical properties of the battery may vary depending on a direction in which a pattern is formed. That is, a battery including an exterior material with a pattern formed in the TD of the exterior material may be different in mechanical properties from a battery including an exterior material with a pattern formed in the MD of the exterior material. Accordingly, the direction in which the pattern is formed may affect the durability of the flexible battery.

Figure 2:
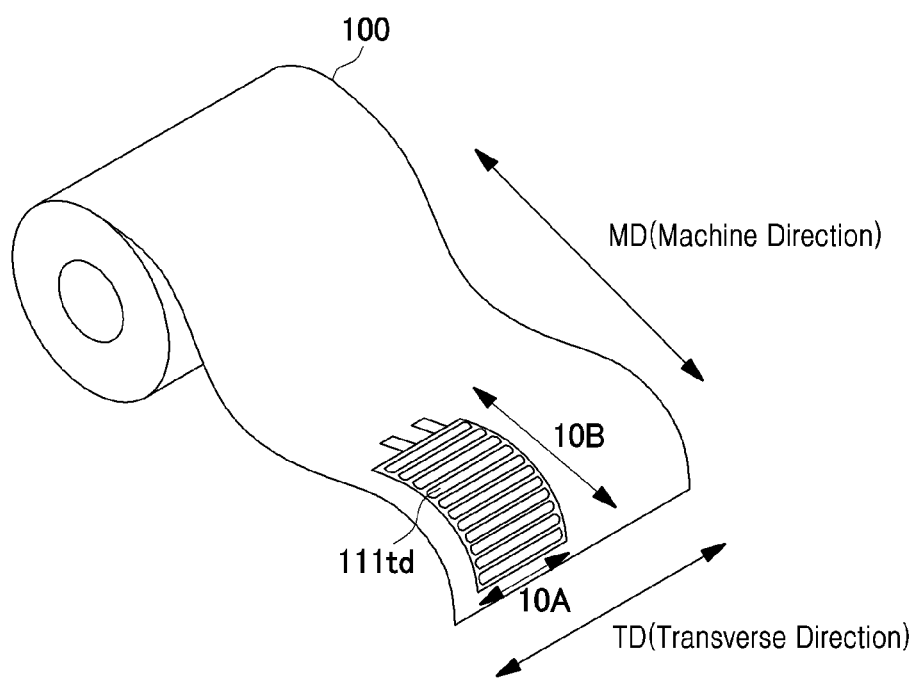
FIG. 2 illustrates an exterior material and a pattern part according to an embodiment of the present disclosure.

FIG. 2 illustrates an exterior material and a pattern part according to an embodiment of the present disclosure. Referring to FIG. 2, the exterior material 100 may include at least one pattern part 111td formed in the TD of the exterior material 100.

When a battery is manufactured including the exterior material 100 on which the pattern part 111td shown in FIG. 2 is formed, the TD of the exterior material may be a width direction 10A of the battery and the MD of the exterior material may be a longitudinal direction 10B of the battery.

Figure 3:
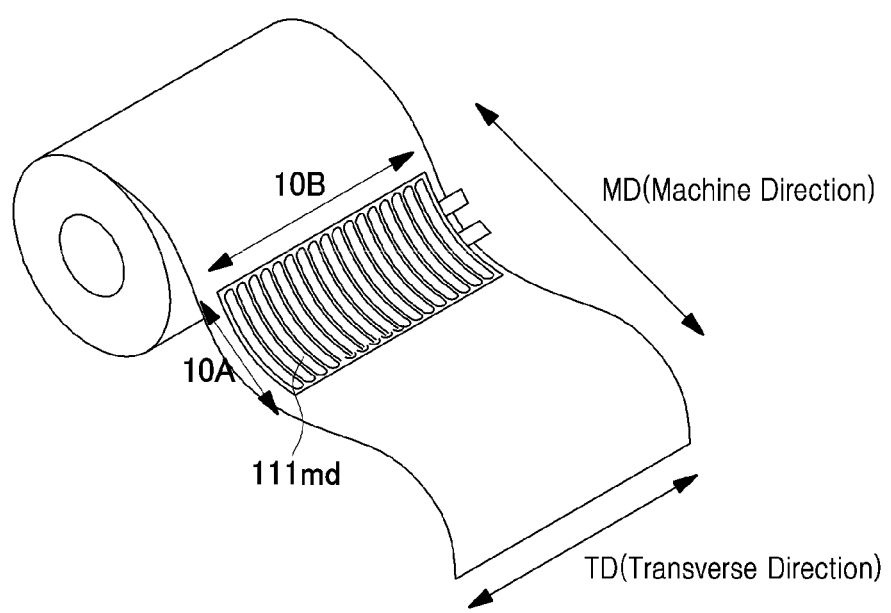
FIG. 3 illustrates an exterior material with a pattern part formed in a different direction from the pattern part shown in FIG. 2.

FIG. 3 illustrates an exterior material with a pattern part 111md formed in a different direction from the pattern part 111td shown in FIG. 2. On the exterior material shown in FIG. 3, the pattern part 111md is formed in the MD of the exterior material.

When the battery is manufactured including the exterior material 100 on which the pattern part 111md shown in FIG. 3 is formed, the MD of the exterior material may be the width direction 10A of the battery and the TD of the exterior material may be the longitudinal direction 10B of the battery.

Referring to and comparing FIG. 2 and FIG. 3, if the pattern part is formed in the TD of the exterior material, there is an advantage in terms of manufacturing of the flexible battery. As shown in FIG. 3, if the pattern part is formed in the MD of the exterior material, when the battery is manufactured, the width of the exterior material and battery manufacturing devices such as a roll and molds for forming the pattern part need to be enlarged in the longitudinal direction according to the length of the battery.

However, as shown in FIG. 2, if the pattern part is formed in the TD of the exterior material, the above-described problem does not occur in manufacturing of the battery even when the length of the battery is increased. Therefore, if the pattern part is formed in the TD of the exterior material, it is easy to flexibly change the size of the battery and it is possible to manufacture large and long batteries by using a slim device without the need to enlarge the battery manufacturing devices according to the length of the battery.

Figure 4A:
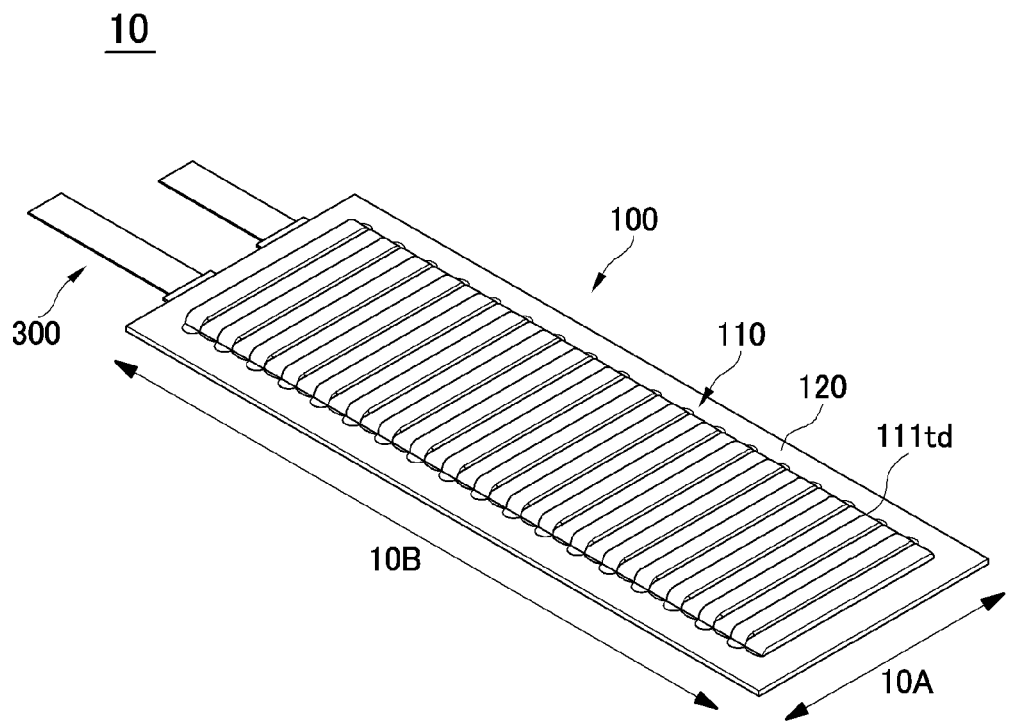
FIG. 4A is a perspective view illustrating a battery including the exterior material according to an embodiment of the present disclosure.
Figure 4B:
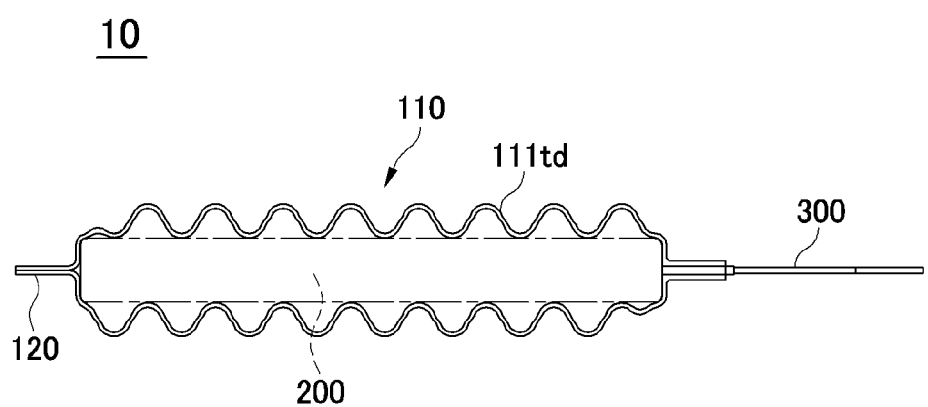
FIG. 4B is a cross-sectional view of the battery shown in FIG. 4A.

FIG. 4A is a perspective view illustrating a battery including the exterior material 100 according to an embodiment of the present disclosure, and FIG. 4B is a cross-sectional view of the battery shown in FIG. 4A.

Referring to FIG. 4A and FIG. 4B, a battery 10 includes the exterior material 100, an electrode assembly 200 accommodated within the exterior material 100 and an electrode lead 300 connected to the electrode assembly 200.

The electrode assembly 200 includes a plurality of electrodes and may further include a separator, and may have a structure in which they are stacked in a thickness direction.

The electrode assembly 200 may include first and second electrodes having different polarities, and a mixture including an active material may be coated on both surfaces or one surface of each of the first and second electrodes. A separator may be interposed between the first electrode and the second electrode. For example, in the first electrode used as a negative electrode, a current collector is made of copper, aluminum, etc., and an anode material which is one or a combination of graphite, carbon, lithium, silicon, silicon derivatives, such as $SiO_x$, silicon-graphite composite, tin and silicon-tin composite. Also, in the second electrode used as a positive electrode, a current collector is made of aluminum, stainless steel, etc., and a cathode material which is one or a combination of lithium cobalt oxide, lithium nickel oxide, lithium manganese oxide, lithium cobalt-manganese oxide, lithium cobalt-nickel oxide, lithium manganese-nickel oxide, lithium cobalt-nickel-manganese oxide, lithium cobalt-nickel-aluminum oxide and lithium iron phosphate. The electrode assembly 200 has a shape having a small thickness in the thickness direction in which the active materials and the separator are stacked, and the active materials extend longer in a longitudinal direction than in a width direction among two directions in which the first and second electrodes extend to form a surface, and intersect with (for example, orthogonal to) the directions in which the surface is formed.

Further, the electrode assembly 200 may include electrode connection tabs and lead connection tabs. The electrode connection tabs may be formed to protrude from one ends of the first and second electrodes in the longitudinal direction, and electrode connection tabs protruding from electrodes having the same polarity may be coupled to each other. The electrodes may be electrically connected in parallel by the electrode connection tabs. The lead connection tabs are connected to the electrode lead 300, and may protrude from the electrodes of the positive electrode and the negative electrode so as to be coupled to the electrode lead 300.

Specifically, the exterior material 100 may include an accommodating part 110 and a sealing part 120. The accommodating part 110 may form a space for accommodating the electrode assembly 200, and the sealing part 120 may be bonded to seal the accommodated electrode assembly 200 from the outside. As shown in FIG. 4B, the accommodating part 110 may correspond to an area of the two exterior materials 100 that face each other while being spaced apart from each other. In order to form the accommodating part 110, the exterior material 100 may be processed to be pressed and protruded in the thickness direction so that a predetermined area of the exterior material 100 has a substantially rectangular bowl (or cup) shape.

More specifically, the at least one pattern part 111td extending in the TD of the exterior material 100 may be formed on the surface of the accommodating part 110 of the present embodiment. The pattern part 111td extends in one direction and is repeatedly disposed in a direction intersecting with the one direction. Specifically, the pattern part 111*td* is protruded and recessed alternately in the thickness direction (i.e., protruded alternately in opposite directions) so as to have a concavo-convex shape along the one direction. Here, the one direction may be the width direction 10A of the battery, which is the TD of the exterior material 100, and the direction in which the pattern part 111*td* is repeated may be the longitudinal direction 10B of the battery. Due to the protruded and recessed pattern part 111*td*, the exterior material 100 forming the accommodating part 110 may have a wavy or pleated pattern in the longitudinal direction as shown in FIG. 4B.

The sealing part 120 is formed by bonding two sealing surfaces. The sealing surfaces refer to bonding surfaces of the exterior material 100, and the two sealing surfaces overlapping along the edges of the accommodating part 110 are bonded to each other so that an inner space (the accommodating part 110) can be isolated from the outside. The electrode assembly 200 and the electrolyte described above may be accommodated in the inner space, and the electrode assembly 200 and the electrolyte may be kept in a sealed state.

Further, the sealing part 120 may have a flat plate shape extending in the width direction 10A of the battery or the longitudinal direction 10B of the battery. For example, the flat plate shape of the sealing part 120 may be unbent so that its surfaces do not face each other. Alternatively, the sealing part 120 may have a different pattern from the pattern part 111*td*. For example, the sealing part 120 may have a pattern having a lower height in the thickness direction than the pattern part 111*td*.

Meanwhile, the electrode lead 300 is connected to the electrode assembly 200 inside the exterior material 100 and extended to be exposed to the outside of the exterior material 100. The electrode lead 300 functions as a terminal for electrical connection with the electrode assembly 200 accommodated within the exterior material 100, and when the sealing part 120 is formed, the electrode lead 300 may be bonded as being interposed between the sealing surfaces so as to penetrate the sealing part 120. A pair of electrode leads 300 of the positive electrode and the negative electrode may be coupled to the respective lead connection tabs having the same polarity and provided in the electrode assembly 200.

FIG. 5 is a diagram for explaining the effect of the battery including the exterior material according to an embodiment of the present disclosure. When the battery is repeatedly bent, the electrode current collectors may be cracked and the electrodes may be damaged and shorted. As the electrodes inside the battery are misaligned, dendrites are generated on the negative electrode, which may cause a safety issue such as internal short circuit.

Figure 5A:
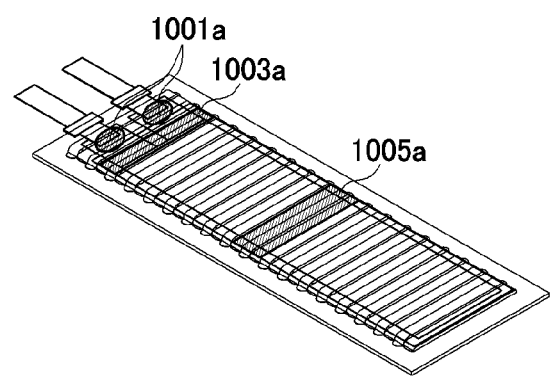
FIG. 5 is a diagram for explaining the effect of the battery including the exterior material according to an embodiment of the present disclosure.

FIG. 5A illustrates the battery having a structure in which a tab-lead coupling portion 1001*a* is thermally bonded onto an electrode assembly. Referring to FIG. 5A, when the battery is bent a plurality of times, it is highly likely that damage such as cracks, cuts, etc. occurs particularly in the tab-lead coupling portion 1001*a*, an electrode tab 1003*a* and a central portion 1005*a* of the electrode.

Figure 5B:
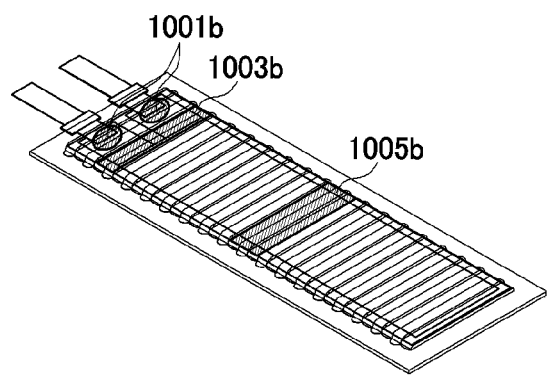

FIG. 5B illustrates the battery having an intercalation structure in which a tab-lead coupling portion 1001*b* is inserted/aligned inside the separator of the electrode assembly. Even in the battery having the intercalation structure shown in FIG. 5B, when the battery is bent a plurality of times, it is highly likely that damage such as cracks, cuts, etc. occurs in the tab-lead coupling portion 1001*b*, an electrode tab 1003*b* and a central portion 1005*b* of the electrode.

If the above-described battery shown in FIG. 5A and FIG. 5B includes an exterior material in which a pattern part is formed in the TD of the exterior material according to the present disclosure, the resistance to deformation of the exterior material caused by the electrode assembly is increased. Thus, a bending curvature can be uniform in the longitudinal direction of the battery, and it is possible to minimize break or cuts caused by concentration of force on specific portions of the exterior material and the electrode assembly.

That is, the pattern part may be formed in the TD of the exterior material to reduce and disperse the force concentrated on the electrode assembly inserted into the exterior material. Since the pattern part is formed in the TD of the exterior material, the bending moment compressive stress is increased and the probability of damage to weak portions of the exterior material and the electrode assembly, such as the tab-lead coupling portion, the electrode tab and the central portion of the electrode, can be greatly reduced.

Figure 6:
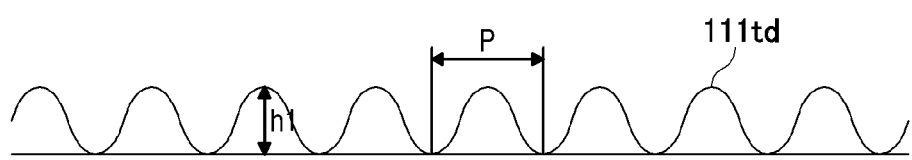
FIG. 6 is a cross-sectional view of the pattern part according to an embodiment of the present disclosure.

Hereafter, the exterior material 100 and the pattern part 111*td* according to an embodiment of the present disclosure will be described. FIG. 6 is a cross-sectional view of the pattern part 111*td* according to an embodiment of the present disclosure. Referring to FIG. 6, the pattern part 111*td* may be formed such that a concavo-convex shape having a constant pattern height h1 and a constant pattern pitch P is repeated.

Figure 7:
FIG. 7 is a diagram for explaining a method of evaluating the compressive stress of a patterned exterior material.

FIG. 7 is a diagram for explaining a method of evaluating the compressive stress of a patterned exterior material. As shown in FIG. 7, the compressive stress of the exterior material 100 is measured while a force is applied to the exterior material 100 so that the height of the pattern part 111*td* is deformed within a predetermined range. For example, a force may be applied to the exterior material 100 so that the pattern part 111*td* has a height h2 equal to 50% of the pattern height h1.

That is, the compressive stress of the exterior material 100 is measured in a state where a load is applied to the exterior material 100 with a displacement limited to a predetermined strain with respect to a height of the pattern part 111*td*. Herein, the strain is defined as (h1−h2)/h1×100(%). The predetermined strain may be, for example, 50%.

It is assumed that a portion deformed when a load is applied to the exterior material 100 is the pattern part 111*td* and the thickness of the exterior material 100 does not change.

Likewise, the compressive stress of the exterior material 100 is measured in a state where a load is applied to the exterior material 100 with a displacement limited to a predetermined strain with respect to another exterior material with at least one pattern part 111*md* formed in the MD of the exterior material 100.

Herein, as the bending moment compressive stress of the exterior material with the pattern part 111*td* or 111*md* increases, the resistance to deformation of the exterior material caused by the electrode assembly increases. Thus, the battery has excellent durability.

Table 1 shows the thickness of each component of an exterior material A and an exterior material B and the total thickness thereof.

TABLE 1

| Component | Exterior Material A | Exterior Material B |
|---|---|---|
| PET | — | 12 μm |
| Nylon | 25 μm | 15 μm |
| Al foil | 40 μm | 40 μm |
| PP | 45 μm | 80 μm |
| Total Thickness | 113 μm | 153 μm |

Table 2 shows the values of compressive stress measured when a load is applied such that a strain of a pattern part becomes 50% as shown in FIG. 7 in each of a case where the pattern part is formed in the TD of the exterior material A (TD pattern) and a case where the pattern part is formed in the MD of the exterior material A (MD pattern).

TABLE 2

| | Compressive Stress (kgf/mm$^2$) | | Strain (%) | |
|---|---|---|---|---|
| | Exterior Material A | | | |
| Sample No. | MD pattern | TD pattern | MD pattern | TD pattern |
| Sample 1 | 3.933 | 4.159 | 50 | 50 |
| Sample 2 | 3.936 | 4.067 | 50 | 50 |

Referring to Table 2, as a result of the two tests, the exterior material A is applied with a greater compressive stress when the TD pattern is formed thereon than when the MD pattern is formed thereon.

Table 3 shows the values of compressive stress measured when a force is applied such that a strain of a pattern part becomes 50% as shown in FIG. 7 in each of a case where the pattern part is formed in the TD of the exterior material B composed of different components from the exterior material B (TD pattern) and a case where the pattern part is formed in the MD of the exterior material B (MD pattern).

TABLE 3

| | Compressive Stress (kgf/mm$^2$) | | Strain (%) | |
|---|---|---|---|---|
| | Exterior Material B | | | |
| Sample No. | MD pattern | TD pattern | MD pattern | TD pattern |
| Sample 1 | 4.162 | 4.347 | 50 | 50 |
| Sample 2 | 4.137 | 4.312 | 50 | 50 |

Referring to Table 2, as a result of the two tests, the exterior material B is also applied with a greater compressive stress when the TD pattern is formed thereon than when the MD pattern is formed thereon.

According to Table 2 and Table 3, it was confirmed that both the exterior material A and the exterior material B have a greater compressive stress when the pattern part is formed in the TD of the exterior material than when the pattern part is formed in the MD of the exterior material.

As the bending moment compressive stress of the exterior material increases, the resistance to the compressive force of the electrode assembly caused by deformation of the battery due to an external force may increase.

Accordingly, by forming the pattern part in the TD on the exterior material, the resistance to deformation of the exterior material caused by the electrode assembly may be increased and the durability of the battery may be improved.

The tensile strength of the exterior material may be different between the TD of the exterior material and the MD of the exterior material. For example, the tensile strength measured in the TD of the exterior material may be greater than the tensile strength measured in the MD of the exterior material.

When the tensile strength measured in the TD of the exterior material is greater than the tensile strength measured in the MD of the exterior material, the compressive stress when the pattern part is formed in the TD of the exterior material is greater than the compressive stress when the pattern part is formed in the MD of the exterior material.

For example, an exterior material according to the present disclosure may be folded in the MD of the exterior material and used in manufacturing a battery. When the battery is manufactured, the exterior material folded in the MD of the exterior material can be bent in the MD of the exterior material, which enables the battery to be bent in the MD of the exterior material.

For another example, the exterior material may be folded in the TD of the exterior material and used in manufacturing a battery. When the battery is manufactured, the exterior material folded in the TD of the exterior material can be bent in the MD of the exterior material, which enables the battery to be bent in the MD of the exterior material.

Figure 8:
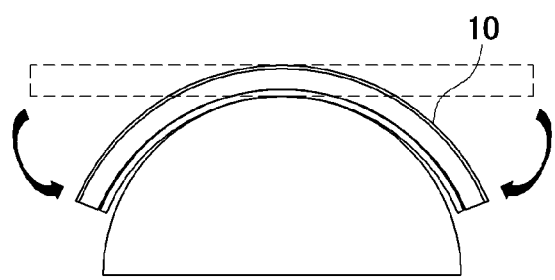
FIG. 8 is a diagram for explaining a method of evaluating the bending durability of a battery including an exterior material.

FIG. 8 is a diagram for explaining a method of evaluating the bending durability of a battery including an exterior material. Referring to FIG. 8, a bending test may be performed by bending the battery 10 including the exterior material 100 a plurality of times in one direction.

As for the battery 10 including the exterior material 100 with the pattern part 111td, a bending test may be performed in the MD of the exterior material. In other words, the bending test may be performed by bending the battery including the exterior material 100 in the longitudinal direction 10B of the battery.

As for the battery including the exterior material with the pattern part 111md, a bending test may be performed by bending the battery including the exterior material in the TD of the exterior material, i.e., in the width direction 10A of the battery.

In an embodiment, a bending test may be performed by bending the battery under conditions of R15 and 25 rpm.

Table 4 shows the results of the bending test performed on any one of the exterior material A and the exterior material B shown in Table 2 in a case where the pattern part is formed in the TD of the exterior material (TD pattern) or the pattern part is formed in the MD of the exterior material (MD pattern). For example, Battery 1 in Table 4 refers to a battery including the exterior material A on which a pattern part is formed in the MD of the exterior material.

TABLE 4

| | Battery 1 | Battery 2 | Battery 3 | Battery 4 |
|---|---|---|---|---|
| Sample No. | Exterior Material A (113 μm) | | Exterior Material B (153 μm) | |
| Pattern Direction | MD pattern | TD pattern | MD pattern | TD pattern |
| Pattern Pitch | 3 | 3 | 3 | 3 |
| Compressive Stress(kgf/mm$^2$) | 3.933 | 4.159 | 4.162 | 4.347 |

TABLE 4-continued

|  | Battery 1 | Battery 2 | Battery 3 | Battery 4 |
|---|---|---|---|---|
| Bending Durability | 1681 times/ 3000 times | 3000 times/ 3000 times | 3228 times/ 5000 times | 5000 times/ 5000 times |
| Voltage before Bending | 3.802 V | 3.801 V | 3.804 V | 3.802 V |
| Voltage after Bending | — | 3.799 V | — | 3.801 V |
| Capacity after Bending (Capacity Retention Rate) | — | 52.6 mAh (96.3%) | — | 53.3 mAh (98.1%) |
| Condition | Cut of electrode tab, Misalignment and damage of electrode, Damage of exterior material-leakage | Crack in electrode | Cut of electrode tab, Misalignment of electrode, Damage of exterior material-leakage | — |

In Table 4, the bending durability indicates how many times the battery operates normally when the bending test is performed on the battery. Battery 1 including the exterior material A on which the pattern part is formed in the MD of the exterior material operated normally until it was bent 1681 times. Battery 2 including the exterior material A on which the pattern part is formed in the TD of the exterior material operated normally even after a total of 3000 times bending performed in the bending test.

Battery 3 including the exterior material B on which the pattern part is formed in the MD of the exterior material operated normally until it was bent 3228 times. Battery 4 including the exterior material B on which the pattern part is formed in the TD of the exterior material operated normally even after a total of 5000 times bending performed in the bending test.

Also, as a result of performing the bending test on Battery 1 and Battery 3, cut of the electrode tab, misalignment and damage of the electrode, damage to the exterior material and leakage of the electrolyte occurred. In the battery in which the exterior material was damaged (cracks, pinholes), excessive swelling occurred under high-temperature and high-humidity atmosphere, for example, a temperature of 45° C. and a humidity of 90% to 95%.

According to the results of the bending test on Batteries 1 to 4 shown in Table 4, it was confirmed that both the exterior material A and the exterior material B exhibit better bending durability when the pattern part is formed in the TD of the exterior material than when the pattern part is formed in the MD of the exterior material.

Accordingly, by forming the pattern part in TD on the exterior material, the resistance to deformation of the exterior material caused by the electrode assembly is increased, which delays and suppresses damage to the exterior material. Thus, it is possible to improve the bending durability and safety of the battery even after more times of bending.

Figure 9:
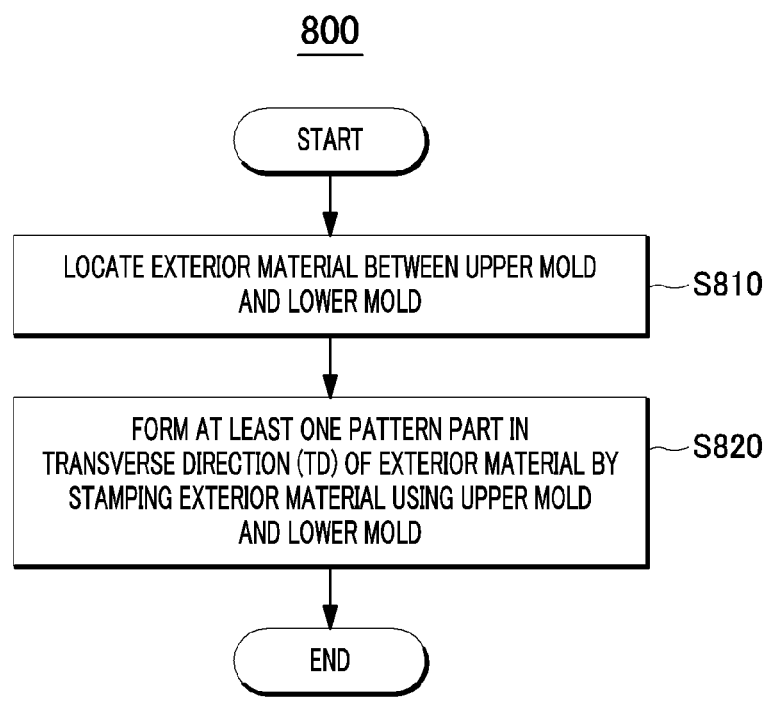
FIG. 9 is a flowchart showing a method of forming a pattern on an exterior material according to an embodiment of the present disclosure.

FIG. 9 is a flowchart showing a method of forming a pattern on an exterior material according to an embodiment of the present disclosure.

In a process S810, the exterior material 100 may be located between an upper mold and a lower mold.

In a process S820, at least one pattern part 111td may be formed in the TD of the exterior material 100 by stamping the exterior material 100 using the upper mold and the lower mold.

Herein, the TD of the exterior material may refer to a width direction of a battery including the exterior material, and the MD of the exterior material may refer to a longitudinal direction of the battery including the exterior material.

In the descriptions above, the processes S810 to S820 may be divided into additional processes or combined into fewer processes depending on an embodiment. In addition, some of the processes may be omitted and the sequence of the processes may be changed if necessary.

Figure 10:
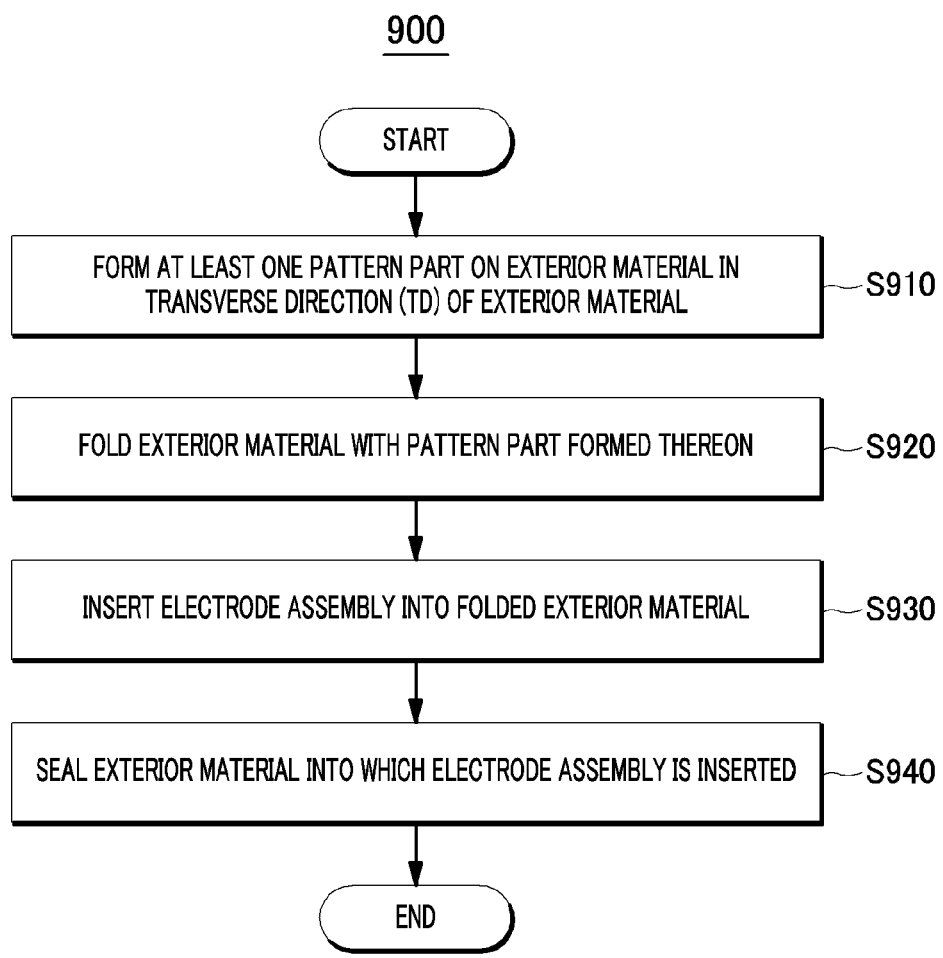
FIG. 10 is a flowchart showing a method of manufacturing a battery including an exterior material according to an embodiment of the present disclosure.

FIG. 10 is a flowchart showing a method of manufacturing a battery including an exterior material according to an embodiment of the present disclosure.

In a process S910, at least one pattern part 111td may be formed on the exterior material 100 in the TD of the exterior material 100.

In a process S920, the exterior material 100 on which the pattern part 111td is formed may be folded.

In a process S930, the electrode assembly 200 may be inserted into the folded exterior material 100.

For example, an exterior material may include a pattern part corresponding to an upper surface of a battery and a pattern part corresponding to a lower surface of the battery in the TD of the exterior material, and the exterior material may be folded along the central axis between the two pattern parts in the MD of the exterior material (folding operation). The exterior material folded along the central axis between the two pattern parts is located such that the pattern part corresponding to the upper surface of the battery overlaps the pattern part corresponding to the lower surface of the battery, and an electrode assembly may be inserted to overlap the pattern parts.

For another example, an exterior material on which a pattern part is formed in the TD of the exterior material may be folded in the TD of the exterior material. An electrode assembly may be inserted into the folded exterior material.

In a process S940, the exterior material 100 into which the electrode assembly 200 is inserted may be sealed. For example, the exterior material 100 may include four sealing areas formed by sealing four surfaces enclosing the exterior material, and two of them may be formed in the TD of the exterior material 100 and the other two may be formed in the MD of the exterior material 100.

Here, Herein, the TD of the exterior material may refer to a width direction of a battery including the exterior material, and the MD of the exterior material may refer to a longitudinal direction of the battery including the exterior material.

In the descriptions above, the processes S910 to S940 may be divided into additional processes or combined into fewer processes depending on an embodiment. In addition, some of the processes may be omitted and the sequence of the processes may be changed if necessary. In particular, the process of forming the pattern part on the exterior material may be performed before sealing the exterior material or after sealing the exterior material in the present disclosure.

As described above, the battery including the exterior material on which the pattern part is formed in the TD of the exterior material can suppress damage to the inner electrode assembly and the exterior material caused by concentration of force on a specific portion of the battery and thus can be applied to a device that requires flexibility and rigidity.

For example, the battery in the device may have a bending radius in the range of 35R (ankle circumference) to 150R (hip circumference) and can be applied to devices such as an ankle band, a neckband, a headset and the like.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A battery including an exterior material, the exterior material comprising:
   at least one pattern part formed in a transverse direction (TD) of the exterior material,
      wherein the TD of the exterior material is an axial direction of a roll of the exterior material manufactured by a roll-to-roll process and is a width direction of the battery; and
   a machine direction (MD) of the exterior material is a longitudinal direction of the roll of the exterior material and is a longitudinal direction of the battery including the exterior material,
      wherein tensile strength of the exterior material measured in the TD is greater than tensile strength of the exterior material measured in the MD.

2. The battery of claim 1,
   wherein the exterior material is folded in the MD of the exterior material and used in manufacturing the battery, and
   the exterior material used in manufacturing the battery is bent in the MD of the exterior material, which enables the battery to be bent in the MD of the exterior material.

3. The exterior of claim 1,
   wherein the exterior material is folded in the TD of the exterior material and used in manufacturing the battery, and
   the exterior material used in manufacturing the battery is bent in the MD of the exterior material, which enables the battery to be bent in the MD of the exterior material.

4. The battery of claim 1,
   wherein the exterior material is applied with a greater compressive stress than another exterior material with at least one pattern part formed in the MD of the exterior material.

5. The battery of claim 4, wherein the compressive stress of the exterior material is measured in a state where a load is applied to the exterior material with a displacement limited to a predetermined strain with respect to a height of the pattern part.

6. The battery of claim 1, wherein the exterior material is formed into a multilayer structure in which at least one material is laminated.

7. A method for manufacturing a battery, comprising:
   forming at least one pattern part on an exterior material in a transverse direction (TD) of the exterior material in a battery including exterior material;
   folding the exterior material;
   inserting an electrode assembly into the folded exterior material; and
   sealing the exterior material into which the electrode assembly is inserted,
      wherein the TD of the exterior material is an axial direction of a roll of the exterior material manufactured by a roll-to-roll process and is a width direction of the battery including the exterior material; and
   a machine direction (MD) of the exterior material is a longitudinal direction of the battery including the exterior material,
      wherein tensile strength of the exterior material measured in the TD is greater than tensile strength of the exterior material measured in the MD.

* * * * *